United States Patent [19]
Herbert et al.

[11] Patent Number: 5,572,782
[45] Date of Patent: Nov. 12, 1996

[54] FLEXIBLE BELT ASSEMBLY

[75] Inventors: William G. Herbert, Williamson; Abraham Cherian; Ernest F. Matyi, both of Webster, all of N.Y.

[73] Assignee: Xerox Corporation, Stamford, Conn.

[21] Appl. No.: 159,613

[22] Filed: Dec. 1, 1993

[51] Int. Cl.⁶ .............................. B23P 11/00; B23P 17/00
[52] U.S. Cl. ...................... 29/426.4; 29/419.2; 29/426.5; 29/525.05; 29/525.08
[58] Field of Search ................................ 29/419.2, 888.3, 29/525.1, 525.01, 525.05, 525.08, 426.4, 426.5, 426.6; 228/116, 265; 72/56

[56] References Cited

U.S. PATENT DOCUMENTS

| | | | |
|---|---|---|---|
| 1,648,026 | 11/1927 | Murray | 228/265 X |
| 1,973,113 | 9/1934 | Schulz | 228/265 X |
| 2,976,907 | 3/1961 | Harvey et al. | |
| 3,214,832 | 11/1965 | Schwinghamer | 72/56 X |
| 3,222,771 | 12/1965 | Schwinghamer | 72/56 X |
| 4,249,298 | 2/1981 | Kanamaru et al. | 29/525.1 X |
| 4,501,646 | 2/1985 | Herbert . | |
| 4,610,069 | 9/1986 | Darbois | 29/419.2 |
| 4,678,691 | 7/1987 | Herbert, Jr. et al. . | |
| 4,743,253 | 5/1988 | Magladry | 29/419.2 X |
| 4,865,635 | 9/1989 | Cuevas | 29/419.2 X |
| 5,167,987 | 12/1992 | Yu . | |
| 5,454,154 | 10/1995 | Cherian et al. | 29/426.4 |

FOREIGN PATENT DOCUMENTS

| 0073489 | 6/1980 | Japan | 228/265 |
|---|---|---|---|

*Primary Examiner*—Joseph M. Gorski
*Attorney, Agent, or Firm*—Oliff & Berridge

[57] ABSTRACT

A flexible belt assembly is prepared by positioning an edge of a belt-shaped substrate in proximity to a metal filled gasket within a groove of a support flange. An electromagnetic force is applied to the gasket to soften the metal to cause conforming of the shape of the gasket to the edge and to the groove. The flexible belt assembly is disassembled by applying a magnetic force to loosen the conforming compression fit.

14 Claims, 2 Drawing Sheets

FLEXIBLE BELT ASSEMBLY

BACKGROUND OF THE INVENTION

This invention relates to a flexible belt assembly and in particular, to a flexible belt assembly for use as an electrostatographic imaging member.

In electrostatography, an electrophotographic imaging member is imaged by first uniformly electrostatically charging its surface. The photosensitive imaging member is then exposed to a pattern of activating electromagnetic radiation such as light. The radiation selectively dissipates the charge in the illuminated areas of the photoconductive insulating layer while leaving behind an electrostatic latent image in the non-illuminated areas. The electrostatic latent image is then developed to form a visible image by depositing finely divided electroscopic marking particles on the surface of the photoconductive insulating layer. The resulting visible image is transferred from the imaging member directly or indirectly to a support such as paper. This imaging process can be repeated many times with reusable imaging members.

The photosensitive member is provided in a variety of forms. Typical imaging members include, for example, photoreceptors for electrophotographic imaging systems, and electroreceptors or ionographic imaging members for electrographic imaging systems. Both electrophotographic and ionographic imaging members are commonly used in either belt-form or drum-form. Electrostatographic imaging member belts are seamless or seamed. The belts typically comprise a flexible supporting substrate coated with one or more layers of photoconductive material. The substrates are inorganic, such as electroformed nickel, or organic, such as a film-forming polymer. The photoconductive coatings applied to these belts are inorganic or organic. Inorganic coatings include selenium or selenium alloys. The organic photoconductive layers comprise, for example, single binder layers in which photoconductive particles are dispersed in a film-forming binder or multilayers comprising, for example, a charge generating layer and a charge transport layer.

The peripheral ends of photoreceptors in the form of a flexible belt assembly are engaged with flanges in a copier's dry mechanism. Copious amounts of quick set glue are required to hold the peripheral belt ends (running parallel to the longitudinal axis of the belt assembly) to the flanges. Often times the glue is unintentionally splattered on the surface of the photoreceptor. The photoreceptor is then unusable and must be rejected. Further, glue attachment of belt to flange causes a problem with salvaging. It is desirable to salvage the belt substrate which may be made up of a valuable metal material such as aluminum. However to salvage the aluminum, the substrate must be separated from the flanges. Substrates which have been glued to the flanges are loosened only with difficulty. Hence generally, the aluminum substrate is salvaged by separating it from the flange by sawing the photoreceptor just inside the glued portion. Only the central portion of the belt may be sold as scrap. The flanges, glue and remaining part of the belt remaining glued to the flange must be discarded.

Other methods for dissembling and salvaging a flexible photoreceptor belt assembly include heat stripping, lathing, and solvent stripping to remove the photosensitive layer(s), blocking layer, adhesive layer, and any other layers typically employed in a photoreceptor from the substrate. These removal processes are labor intensive, require an inordinate amount of manufacturing space, require physical contact with the photoreceptor which may damage it, and contribute to pollution of the environment.

It is desirable to provide a flexible belt assembly wherein the flexible belt is attached to support flange by means whereby the belt may be firmly connected during operation but further whereby the belt may be easily disassembled from the flange for salvaging at the end of belt life.

SUMMARY OF THE INVENTION

The invention provides a flexible belt assembly comprising a belt shaped substrate with longitudinally extending edge. The edge is nestled into a gasket fitted within a groove of a support flange. The extending edge of the flexible belt is firmly held to the groove through conforming compression fit of the gasket to the edge of the substrate and to the groove of the flange.

Further, the invention provides a process for preparing a flexible belt assembly, comprising positioning an edge of the belt shaped substrate in proximity to a metal filled gasket within a groove of a support flange, and applying an electromagnetic force to soften the metal to cause conforming of shape of the gasket to the edge and to the groove to provide the compression fit between substrate and flange.

Further, the invention provides a process for disassembling a flexible belt assembly comprising applying a magnetic field to loosen the conforming compression fit.

DETAILED DESCRIPTION OF THE PREFERRED EMBODIMENT

Figure 1:
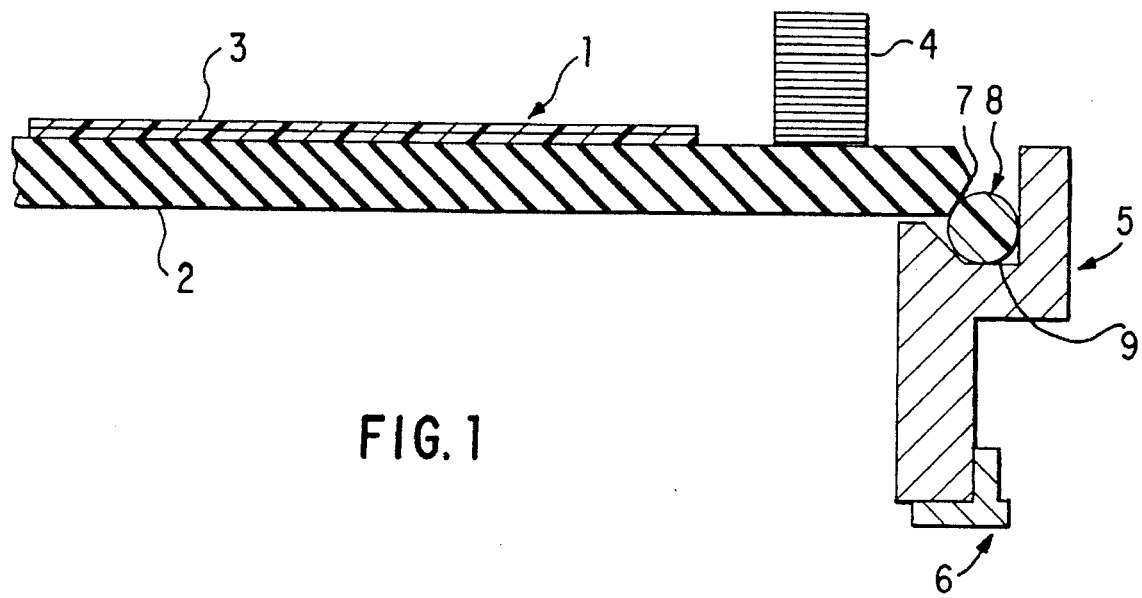
FIG. 1 is a schematic view of an electrophotographic imaging structure positioned in proximity to a metal filled gasket within a groove of a support flange.
Figure 2:
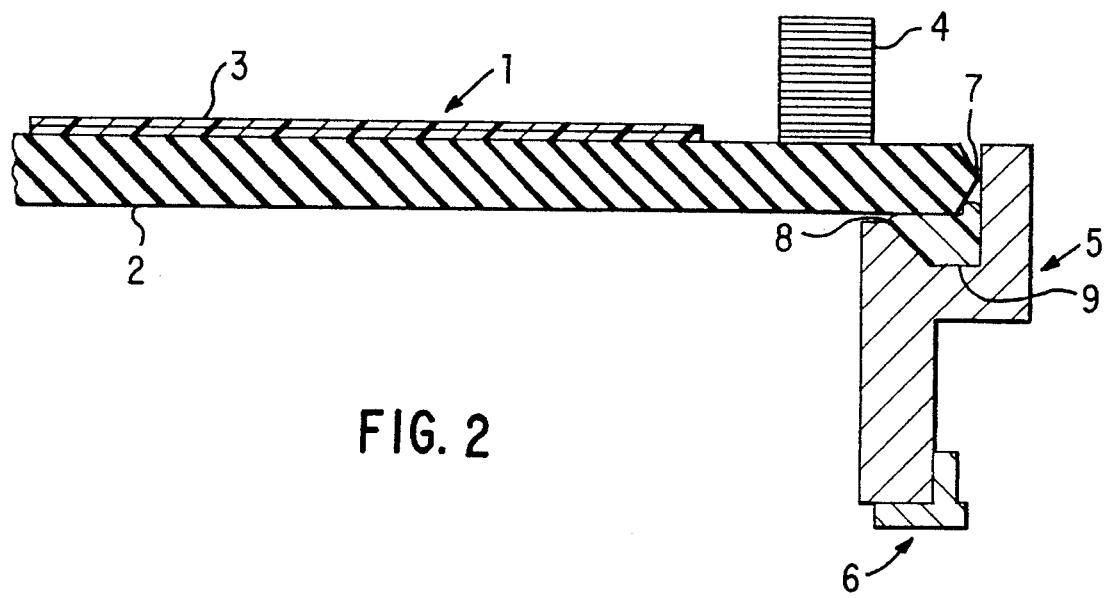
FIG. 2 is a schematic view of the flexible belt assembly of the invention with gasket providing compression fit between substrate and flange.
Figure 3:
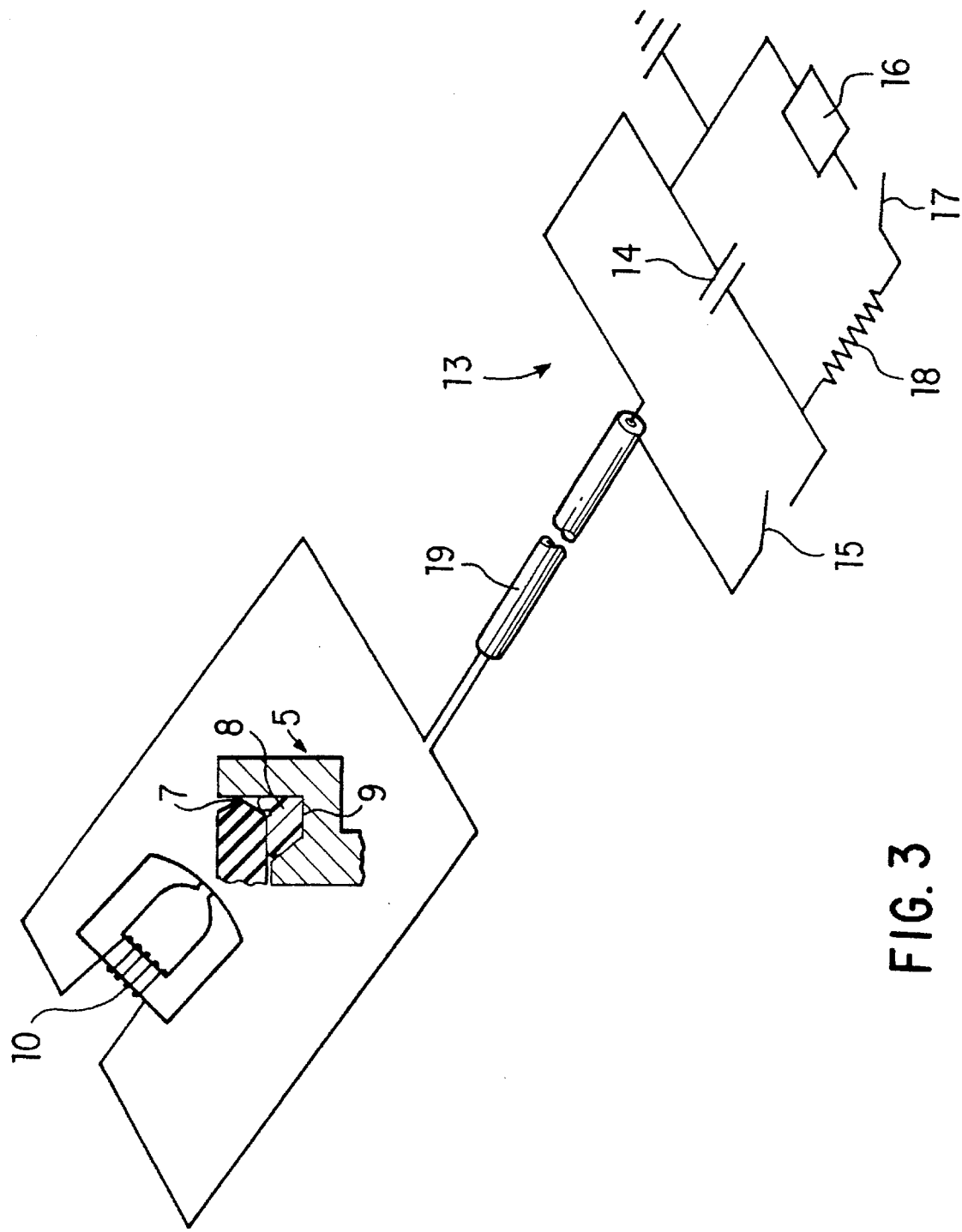
FIG. 3 is a schematic perspective view of an embodiment of the process of disassembling or assembling the flexible belt assembly.

Referring to FIGS. 1–3, photoreceptor 1 comprises substrate 2 and layered material 3. Developer subsystem foot 4 acts as a skid plate to maintain an equal spacing from the photoreceptor in case the photoreceptor is slightly out of round. The photoreceptor 1 is supported by flange 5. Conductive bushing 6 is a standard bushing that may be used in place of a bearing as an electrical ground for the photoreceptor. The photoreceptor has edge 7 which extends parallel to the longitudinal axis of the belt assembly of the photoreceptor. The edge 7 as shown in FIG. 1 is initially positioned in proximity to metal filled gasket 8. The metal filled gasket 8 is positioned within groove 9 of support flange 5. After assembly as shown in FIG. 2, the edge 7 of the photoreceptor belt assembly is compression fitted to the flange 5 by means of the gasket 8.

In a process for preparing the photoreceptor 1 in the form of the flexible belt assembly, the edge 7 of the belt shaped substrate 2 is positioned in proximity to the metal filled gasket 8 within the groove 9 of the support flange 5. An electromagnetic force is applied to soften the metal to cause conforming of the shape of the gasket 8 to the edge 7 and to the groove 9. The process of applying an electromagnetic force to soften constrained metal is called "magnaforming".

Magnaforming is illustrated, for example, in Herbert et al., U.S. patent application Ser. No. 08/043,888, filed Apr. 17, 1993 relating to the removal of coatings from a photoreceptor, and more particularly to a method for stripping layered materials from a photoreceptor, and in Harvey et al., U.S. Pat. No. 2,976,907, Herbert et al., U.S. Pat. No. 4,501,646 and Herbert et al., U.S. Pat. No. 4,678,691, the disclosures of which are incorporated herein by reference.

Magnaforming requires an apparatus for setting up a predetermined varying magnetic field. When a conductive member (conductor) is placed in a varying magnetic field, a current is induced in the conductor. The interaction between this current and the magnetic field will subject the conductor to a force. If the conductor is constrained and if a sufficient amount of energy is acquired by the conductor, the conductor will be deformed. The work performed on, or the energy acquired by the conductor, depends upon the position of the conductor relative to the magnetic field, the strength of the magnetic field, the current induced in the conductor, the mass of the conductor, internal forces within the conductor, and the frequency of variations in the magnetic field. Accordingly, a high instantaneous pressure may be applied to the conductor by utilizing a current pulse to set up the magnetic field.

In the process of preparing the photoreceptor 1 of the invention, after softening the metal within the gasket 8, the electromagnetic force is withdrawn and the metal hardens in conformance to the shape of the edge 7 and to the groove 9. The gasket 8 then provides a compression fit between the substrate 2 and the flange 5.

Thereafter, at the end of the life of the photoreceptor 1, the flexible belt assembly may be easily disassembled by applying a magnetic field to resoften the metal filled gasket 8 to loosen the conforming compression fit. With loosening of the compression conforming fit, the belt shaped substrate 2 is released from the support flange 5.

The process of preparing the flexible belt assembly and/or disassembling the flexible belt assembly is shown schematically in FIGS. 1–3. Referring to FIGS. 1–3, photoreceptor 1 comprises substrate 2 and layered material 3. Photoreceptor 1 is held to support flange 5 by means of gasket 8 in a shape conforming to photoreceptor edge 7 and groove 9 so as to provide a compression fit between the edge 7 and groove 9. Gasket 8 is positioned entirely inside magnetic coil or solenoid 10. Rod 11, gripped by clamps 12, is positioned within photoreceptor 1 to provide support thereto. When a current pulse is applied to magnetic coil 10, a varying magnetic field is set up which induces an electromotive force which causes a high-current to flow around gasket 8. If the energy transferred to gasket 8 by the interaction of the induced current and the magnetic field is sufficient, the metal in gasket 8 melts, permitting it to flow into the shape of the applied force of edge 7 and groove 9.

The varying magnetic field is set up by passing a current pulse through magnetic coil 10. While pulse can be provided in any desired manner, in the illustrated embodiment, pulse is supplied by means of pulsing network 13 which includes high capacity condenser 14 in series with switch 15. The condenser 14 may be charged by means of a suitable high-voltage supply 16 which is connected to the condenser 14 through a switch means 17 and a current limiting resistor 18. Cable 19, such as a coaxial cable, connects pulsing network 13 to coil 10.

During magnaforming, the metal of gasket 8 is softened thereby permitting conforming of the gasket 8 to the edge 7 and to the groove 9 for preparing the belt assembly or permitting loosening of the fit of the gasket 8 to edge 7 and to groove 9 for disassembly. Softening can be completed in a few microseconds, typically from about 1 to about 50 microseconds, after the magnetic field generated energy is transferred to the gasket 8.

When the metal of the gasket 8 is placed in the varying magnetic field, a current is induced in the metal. The interaction between this current and the magnetic field will then subject the metal to a force. If the conductor is constrained and if a sufficient amount of energy is acquired by the metal, the conductor will be deformed. The work performed on, or the energy acquired by the metal depends upon the position of the metal relative to the magnetic field, the strength of the magnetic field, the current induced in the metal, the mass of the metal, internal forces within the metal, and the frequency of variations in the magnetic field. Accordingly, a high instantaneous pressure may be applied to the metal by utilizing a current pulse to set up the magnet field.

By shaping a metal in a suitable form, and passing a current pulse therethrough, a magnetic field of a predetermined shape will be set up almost instantaneously (in the order of a microsecond). Metal positioned in the magnetic field will be formed in a manner depending upon the shape of the magnetic field and the position of metal relative to the field. The duration of the pressure on the metal positioned in the magnetic field is dependent upon the duration of the pulse, and is limited by the allowable increase in the temperature of the metal. Ordinarily, the pulse may be applied for a duration between approximately a microsecond and many microseconds. However at very low ambient temperatures, the pulse may be applied for a longer duration, ranging from microseconds to a minute or so.

The magnetic coil 10 can be of any effective design and dimensions. The coil 10 is fabricated from a suitable conductive metal such as copper. The coil 10 preferably has about 3 to 30 turns, and more preferably about 5 to about 15 turns. The solenoid 10 has the following preferred dimensions: a cross-sectional area of about 0.5 to about 4 square centimeters, and more preferably from about 0.7 to about 2 square centimeters; internal diameter of about 1 to about 10 centimeters, and more preferably about 2 to about 5 centimeters; an outside diameter of about 2 to about 12 centimeters, and more preferably about 4 to about 8 centimeters; and a length of about 4 to about 25 centimeters, and more preferably about 6 to about 14 centimeters. Magnaforming machines incorporating a magnetic coil, energy storage capacitors, and switching devices and components thereof are available for example from Maxwell Laboratories, Inc.

The gasket 8 can be formulated entirely of an electrically conductive material, or it can be an insulating material such as an thermoplastic filled with electrically conductive material. Any suitable electrically conductive material can be employed. Typical electrically conductive materials include metals like copper, brass, nickel, zinc, chromium and stainless steel, conductive plastics and rubbers, aluminum, semi-transparent aluminum, steel, cadmium, titanium, silver, gold, paper rendered conductive by the inclusion of a suitable material like carbon black or through conditioning in a humid atmosphere having a relative humidity, for example of greater than 50%, preferably about 50 to about 80%, to ensure the presence of sufficient water content to render the material conductive, indium, tin, metal oxides, including tin oxide and indium tin oxide, and the like.

The amount of energy transferred to gasket 8 for a given solenoid can be increased by increasing the voltage supplied to the condenser 14, increasing the capacity of the condenser or the increasing the number of pulses supplied to the gasket 8. An effective amount of energy is transferred to the photoreceptor, preferably about 0.5 to about 50 kilojoules (kj), more preferably about 0.5 to about 20 kj. During the magnaforming steps of preparing the flexible belt assembly or disassembling the belt assembly, effective pressures are produced by the magnetic field and applied to the gasket 8, preferably up to about 50,000 lbs. per square inch (psi), more preferably about 5,000 to about 20,000 psi, and especially about 10,000 psi.

Typical substrate 2 materials include insulating nonconducting materials such as various resins known for this purpose including polycarbonates, polyamides, polyurethanes, paper, glass, plastic, polyesters such as MYLAR® (available from DuPont) or MELINEX 447® (available from ICI Americas, Inc.), and the like. If desired, a conductive substrate can be coated by, for example, bar coating onto an insulating material. In addition, the substrate can comprise a metallized plastic, such as titanized or aluminized MYLAR®, wherein the metallized surface is in contact with the photosensitive layer or any other layer situated between the substrate and the photosensitive layer. The coated or uncoated substrate can be flexible or rigid, and can have any number of configurations, such as a plate, a cylindrical drum, a scroll, an endless flexible belt, or the like.

The thickness of the substrate layer depends on numerous factors, including economical considerations, and thus this layer may be of substantial thickness, for example, over 200 microns, or of minimum thickness less than 50 microns, provided there are no adverse affects on the final photoconductive device. In one embodiment, the thickness of this layer ranges from about 65 microns to about 150 microns, and preferably from about 75 microns to about 125 microns.

Present on the substrate 2 are one or more of the following layers: a charge blocking layer, an adhesive layer, photoconductive layer(s) and an anti-curl layer, and any other layer typically employed in a photoreceptor. Compositions of each of the layers described herein are illustrated for example in Yu, U.S. Pat. No. 5,167,987, the disclosure of which is incorporated herein by reference. The photoconductive layer may be of the laminate type having separate charge generating and charge transporting layers or of the single-layer type. Preferred charge generating materials include azo pigments such as Sudan Red, Dian Blue, Janus Green B, and the like; quinone pigments such as Algol Yellow, Pyrene Quinone, Indanthrene Brilliant Violet RRP, and the like; quinocyanine pigments; perylene pigments; indigo pigments such as indigo, thioindigo, and the like; bisbenzoimidazole pigments such as Indofast Orange toner, and the like; phthalocyanine pigments such as copper phthalocyanine, aluminochloro-phythalocyanine, and the like; quinocridone pigments; and azulene compounds.

Preferred charge transport materials include compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and the like, and hydrazone compounds. Other typical photoconductive layers include amorphous or alloys of selenium such as selenium-arsenic, selenium-tellurium-arsenic, selenium-tellurium, and the like. The photoconductive layer(s) may be of any suitable thickness.

A single layer type photoconductive layer may have a thickness preferably of about 0.1 to about 100 microns. In preferred embodiments, the charge generating and charge transport layers of a laminate type each may have a thickness of about 0.05 microns to about 50 microns.

Some materials can form a layer which functions as both an adhesive layer and charge blocking layer. Typical blocking layers include polyvinylbutyral, organosilanes, epoxy resins, polyesters, polyamides, polyurethanes, silicones, and the like. The polyvinylbutyral, epoxy resins, polyesters, polyamides, and polyurethanes can also serve as an adhesive layer. Adhesive layers, charge blocking layers, anti-curl layers and any other layers conventionally employed in photoreceptors may have an effective thickness preferably from about 0.1 to about 20 microns.

The invention will now be described in detail with respect to specific preferred embodiments thereof, it being understood that these examples are intended to be illustrative only and the invention is not intended to be limited to the materials, conditions or process parameters recited herein.

EXAMPLE

A cylindrical photoreceptor is vertically positioned on a flat surface. A vertically disposed magnetic coil envelops an edge portion of the photoreceptor. The edge of the photoreceptor rests on a metal filled gasket which is nestled within the groove of a support flange. The coil is coupled through a co-axial cable to an electrical generating device. The coil, cable, and electrical generating device are available from Maxwell Laboratories Inc. The electrical generating device charges and discharges a capacitor to supply 4 kj of energy to the photoreceptor. Within about 20 microseconds the resulting magnetic field softens the gasket permitting the edge portion of the photoreceptor to compress into the surface of the gasket. The magnetic coil is removed from around the gasket, which freezes to grasp the edge portion of the photoreceptor within the conforming gasket surface. The resulting cylindrical photoreceptor is utilized and as the imaging member in a copying machine.

The used cylindrical photoreceptor is salvaged by the application of a magnetic field. The cylindrical photoreceptor to be salvaged is vertically positioned on a flat surface. A vertically disposed magnetic coil envelops an edge portion of the photoreceptor held to the flange by compression fit of the metal filled gasket. The electrical generating device charges and discharges a capacitor to supply four kj of energy to the photoreceptor. Within about 20 microseconds the resulting magnetic field softens the gasket permitting release of the substrate from the flange.

What is claimed is:

1. A process for preparing a flexible belt assembly, comprising the steps of:

(1) positioning an edge of a belt-shaped substrate in proximity to a metal filled gasket located within a groove of a support flange, (2) applying an electromagnetic force to said gasket, thereby softening the metal, and (3) causing the shape of the gasket to conform to the shape of said edge and said groove, thereby attaching said edge to said support flange.

2. The process of claim 1, wherein said causing step includes applying a pressure to said substrate while applying said electromagnetic force.

3. The process of claim 1, comprising withdrawing the electromagnetic force from the gasket thereby causing said metal to harden such that a compression fit between said substrate and said flange is provided.

4. The process of claim 1, wherein said causing step includes applying a pressure to said flange while applying said electromagnetic force.

5. The process of claim 1, wherein said causing step includes applying pressure to said substrate and to said flange while applying said electromagnetic force.

6. The process of claim 1, wherein said causing step includes applying a pressure to said substrate while applying said electromagnetic force, thereby moving said edge such that it impinges against an arm of said flange and thereby has its movement stopped.

7. The process of claim 1, including generating the electromagnetic force by utilizing a magnetic coil.

8. The process of claim 1, wherein said applying step includes transferring energy ranging from about 0.5 to about 50 kj to said metal.

9. The process of claim 1, wherein said applying step includes transferring energy ranging from about 0.5 to about 20 kj to said metal.

10. A process of disassembling a flexible belt assembly having a belt-shaped substrate with an edge nestled within and joined to a metal filled gasket secured within a groove of a support flange, said substrate firmly held to said flange by way of the gasket being compression fit to conform in shape to that of said edge and said groove, comprising the step of applying a magnetic field to said gasket thereby softening the metal of said gasket loosening said gasket from said edge and said groove.

11. The process of claim 10, including generating the electromagnetic force by utilizing a magnetic coil.

12. The process of claim 10, wherein said applying step includes transferring energy ranging from about 0.5 to about 50 kj to said metal.

13. The process of claim 10, wherein said applying step includes transferring energy ranging from about 0.5 to about 20 kj to said metal.

14. A process for preparing a flexible belt assembly, comprising the steps of:

(1) positioning an edge of a belt-shaped substrate in proximity to a metal filled gasket located within a groove of a support flange, (2) applying an electromagnetic force to said gasket, thereby softening the metal, and (3) causing the shape of the gasket to conform to the shape of said edge by compressing said edge into said gasket such that said edge is grasped by said gasket, and causing the shape of the gasket to conform to the shape of the groove, thereby attaching said edge to said support flange.

* * * * *